2

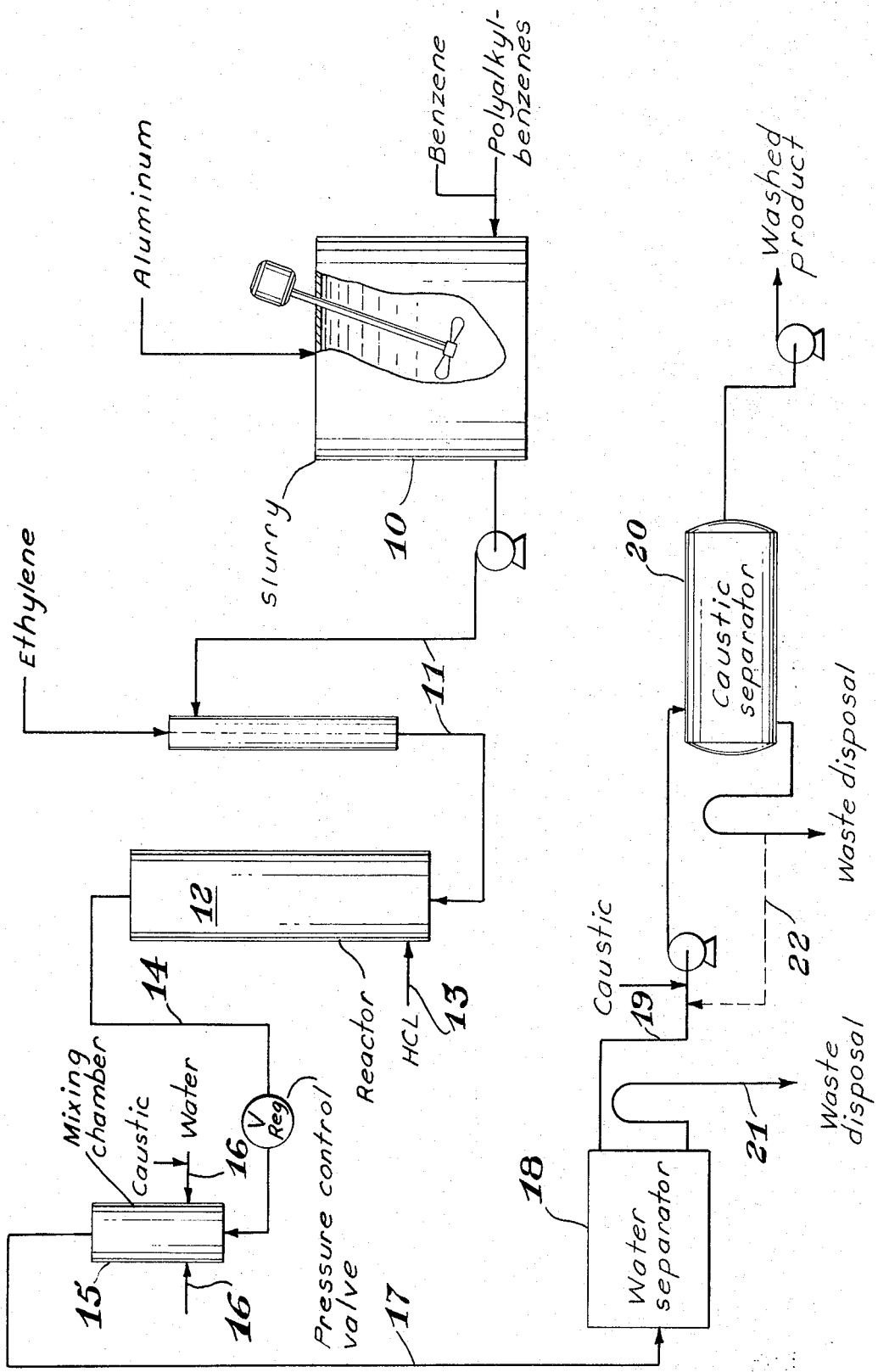

United States Patent Office 3,766,290
Patented Oct. 16, 1973

---

3,766,290
PROCESS FOR THE PREPARATION OF ETHYLBENZENE
Cleo Dale Carlson, Lake Jackson, Tex., assignor to The Dow Chemical Company, Midland, Mich.
Filed Aug. 10, 1972, Ser. No. 279,652
Int. Cl. C07c 3/62
U.S. Cl. 260—672 T      7 Claims

ABSTRACT OF THE DISCLOSURE

An improved process for the alkylation of aromatic compounds in the presence of an aluminum chloride-based catalyst wherein the catalyst is formed in situ in the alkylation reactor and is used single pass with no recycle. The reactor is operated at temperatures of between about 130° C. and about 250° C. and at a pressure sufficient to maintain the aromatic reactants in the liquid phase and for a time of about 2 to about 15 minutes residence time. Simultaneous dealkylation of higher polys is possible while maintaining good production of mono-alkylated product.

---

This invention relates to a process for producing alkylated aromatic hydrocarbons wherein an aromatic hydrocarbon such as benzene is alkylated with an unsaturated aliphatic hydrocarbon and recycled higher alkylated aromatics are simultaneously dealkylated or transalkylated in the presence of an aluminum chloride-hydrocarbon complex catalyst. More particularly, this invention relates to an improved process for the production of ethylbenzene and other alkylated aromatic hydrocarbons which permits the use of smaller equipment, higher throughput rates, higher conversions of polyalkyl benzenes without loss of alkylation efficiency, no catalyst recycle and generally improved industrial efficiency not heretofore achieved.

For many years, alkylated aromatic hydrocarbons have been produced on a large commercial scale by the alkylation of benzene with ethylene in the presence of an aluminum chloride-hydrocarbon complex catalyst. As shown by the ACS Monograph entitled "Styrene," much of the early day ethylbenzene was produced by feeding ethylene, benzene, particulate aluminum chloride and recycled polyalkylbenzenes to an alkylator together with ethyl chloride of HCl as promoter. The alkylator was operated at a temperature of about 95° C. and at a pressure of about 5 p.s.i.g. A crude alkylate, along with the entrained complex catalyst passed from the reactor, was cooled and settled. The catalyst complex which settled out was then pumped back to the alkylator and the crude ethylbenzene was treated with caustic to remove any remaining catalyst and subsequently fractionated. All of the recovered benzene was dried and returned to the alkylator. Likewise, the light polyalkylated benzenes (mostly di- and tri-ethylbenzenes) were returned to the alkylator and the heavier polyalkylated benzenes (residue) were sent to a special dealkylator operated at more severe conditions.

In more recent times, it has been taught to produce the aluminum chloride-hydrocarbon complex catalyst from aluminum metal, HCl and a hydrocarbon rather than using particulate aluminum chloride, e.g. U.S. 2,948,763. The catalyst complex prepared from aluminum metal has also been prepared in situ by feeding a slurry of fine aluminum particles and HCl to the alkylator but it has been generally preferred to prepare the catalyst complex in a separate vessel and then feed it to the reactor rather than form it in the presence of the reactants.

Beyond the preparation of the aluminum chloride-hydrocarbon complex catalyst from aluminum metal and HCl in hydrocarbon solution to avoid the handling problems associated with aluminum chloride, very little change has taken place in the basic ethylbenzene process in the last 20 years. In practice and as shown by the recent literature, alkylators are usually operated at between 80° and 95° C., at or near atmospheric pressure and benzene, catalyst complex and polyalkylated benzenes are all recycled to the reactor.

It is an object of this invention to provide a more efficient process for the production of ethylbenzene. It is a further object to provide a process for the production of ethylbenzene which requires less residence time in the reactor than present commercial processes and which is capable of dealkylating a higher proportion of polyalkyl benzenes during the alkylation reaction. A still further object is to provide an ethylbenzene process which does not require the recycle of the highly corrosive and hazardous catalyst complex to the alkylator. Yet another object is to provide a process in which the reactor and other equipment are many times smaller than the conventional process equipment for equivalent production, thus providing a sizeable capital savings. These and other objects and advantages of the present process will become apparent from the following detailed specification and claims.

It has now been discovered that numerous significant and unexpected advantages are achieved by employing the process steps and conditions of this invention as hereinafter described. In its general terms, the process of this invention comprises the steps of (1) thoroughly admixing, in a reaction vessel, particulate metallic aluminum, an aromatic hydrocarbon, an olefin, polyalkyl aromatic hydrocarbons and anhydrous HCl, (2) simultaneously alkylating the aromatic hydrocarbon and dealkylating or transalkylating the polyalkyl aromatic hydrocarbons in said reaction vessel in the liquid phase at a temperature of between about 130° and 250° C. and a pressure sufficient to maintain the aromatic reactants substantially in the liquid phase, (3) separating the crude product from the catalyst complex, (4) separating the alkylated aromatic hydrocarbons from the unconverted aromatic hydrocarbon, (5) separating the monoalkylated aromatic hydrocarbon from the polyalkylated aromatic hydrocarbons, (6) recycling the aromatic hydrocarbon and polyalkylated aromatic hydrocarbons to the reaction vessel, and (7) recovering the monoalkylated aromatic hydrocarbon.

The catalyst in the present process is preferably formed in situ in the alkylator by feeding a slurry of particulate aluminum metal and gaseous anhydrous HCl directly to the alkylator. Substantially any form of particulate commercially available grades of aluminum metal may be employed but those forms exhibiting a fairly large surface area, such as metal turnings, granulated metal, etc., are highly preferred. Granulated or powdered aluminum having a mesh size of from about −10 to about +40 mesh is particularly desirable. A preferred method of feeding the aluminum to the reactor is in the form of a slurry of the metal in a liquid component such as benzene. It is desirable that the aluminum contact HCl soon after entering the reactor. It has been found that under the reaction conditions of this process, the aluminum chloride complex catalyst formed in situ has sufficient activity to produce the desired alkylation of the benzene without making excessive amounts of undesirable reaction products. The amount of aluminum metal used to form the catalyst in situ is an amount sufficient to make the reaction go at an acceptable rate. Generally, the amount employed is such that the weight ratio of total hydrocarbon fed, i.e. aromatic, olefin and polyalkyl aromatics, to total aluminum metal fed is not less than about 1000 to 1, nor more than about 10,000 to 1. The preferred range of operation is from about 2500 to 1 to about 5000 to 1.

In this manner of operation no separation and recycle of catalyst is required. It was unexpected to discover that in this process, the recycle of catalyst complex is not necessary either to enhance or sustain the reaction and that the alkylator can be started with in situ formed catalyst in the absence of any recycle catalyst complex and without any preheating of the aromatic raw materials. The start-up time is actually reduced over the process which uses particulates $AlCl_3$. Although there is no need to recycle the catalyst, there is nothing to prevent this as long as the residence time is short enough to prevent loss of activity in the catalyslt.

In order to achieve the objects of this invention, it is necessary that the alkylator be operated at a temperature of between about 130° and 250° C. at a pressure sufficient to maintain the aromatics in the liquid phase. At temperatuers below about 130° C. in the instant system the dealkylation reaction is too slow and a longer reaction time is necessary to effect transalkylation. At temperatures above 250° C. the amount of pressure needed to keep the aromatic liquid becomes more costly.

A pressure of at least 115 p.s.i.g. is usually required and a pressure of between about 190–300 p.s.i.g. is preferred. Higher pressures may be employed but there is no advantage in using pressure higher than that required to keep the reactants in the liquid phase.

The process of the present invention, although described primarily in terms of the ethylation of benzene, has been employed to make cumene from propylene and benzene and to make ethyltoluene from ethylene and toluene under substantially the same conditions as herein set forth. Likewise, with only slight alterations in temperatures and pressures, keeping in mind the necessity of maintaining the aromatics in the liquid phase, other lower olefins and aromatic hydrocarbons can be employed in the alkylation reaction.

The operation of the present process permits the use of a feed to the alkylator containing up to 30% by weight polyalkyl benzenes. It is usually desirable, however, to employ polyalkyl benzenes in the feed of from 10 to 20% based on the benzene fed. While all of the polyalkyl benzenes produced in this process may be recycled to the alkylator, it is preferred to recycle the di- and triethyl benzenes (commonly referred to as "light polys").

Under the conditions of this process, the required residence time in the reactor varies with reaction conditions but in general a residence time of from about 4 to about 8 minutes in preferred. At residence times significantly shorter than 2 minutes, the conversion would be so low that considerable recycle of unreacted materials would be required. At reaction times greater than 30 minutes an undesirable amount of side reactions begin to occur. Also, it has been found that aluminum chloride complex becomes less catalytically active at the temperatures employed when exposed for this length of time.

Control of the reaction temperature is most easily achieved by controlling the rate of addition of ethylene to the alkylator. The ethylene employed preferably has a purity of greater than 90%, but the higher the purity the better. Inerts in the ethylene must be compensated for by the use of higher pressure and/or reactor volume. Ethylene of >99% purity is most preferred.

As the liquid reaction product is formed, it passes from the alkylator and pressure is reduced as it passes through a control valve. The products crude ethylebenzene may be utilized in any proven preferred manner by the user.

Although the figure illustrates a conventional reactor vessel, there is nothing to prohibit the use of other types of reactors so long as the flow is sufficiently turbulent to provide thorough mixing of the reactants and the residence time is maintained within the desired limits.

The figure shows a schematic flow diagram of one preferred embodiment of the process of this invention. As shown in the figure, aluminum fines are admixed in vessel 10 with dry benzene and polyalkylbenzenes to form a slurry. The slurry passes through line 11 and just before entering the alkylator 12, the slurry of aluminum metal in a mixture of benzene and poly alkylbenzenes is further mixed with the ethylene feed stream. Anhydrous hydrogen chloride is added to the alkylator 12 through a pipe 13 near the bottom thereof through a sparger so that rapid contact takes place between the mixed feed stream from line 11 and the HCl from line 13. The alkylator product passes from alkylator 12 through line 14 to a quench spool 15 where direct contact is made between the hot alkylator product and a stream of water containing 0.5–1.0% caustic for cooling and washing from lines 16. The small amount of caustic is added to prevent corrosion within the wash system. Alternatively, the hot product from the alkylation reactor may be cooled by cross heat exchange to more efficiently utilize the B.t.u. content of the hot effluent prior to washing with aqueous caustic. The water-quenched products passes through line 17 to a settling tank 18. In settling tank 18 the aqueous and organic layers separate with the aqueous layer being passed through line 21 to a waste-disposal system in accordance with approved ecological practice and the organic alkylate product passing from settling tank 18 through line 19 where it is admixed and sweetened with dilute aqueous caustic (6–10%) and passed to settling tank 20. The aqueous caustic layer may be recycled through line 22 for optimum utilization before it is drawn off and passed to the waste disposal system mentioned above and the crude ethyl benzene is sent to a standard separation and purification section where benzene and polyethylbenzenes are recycled to the alkylator 12.

Although the figure illustrates cooling and washing the product with aqueous caustic, it may be preferred to separate the catalyst complex, e.g. by gravity, utilizing the heat of the crude in its distillation without any cooling or washing. The catalyst complex may then be washed prior to its disposal. Any residual useable polys obtained from the catalyst complex may be utilized in accordance with known technology.

The following examples are provided to illustrate the practice of the invention but are not to be construed as limiting to the scope thereof.

EXAMPLE 1

A series of experiments was conducted to illustrate the operation of the present process under various conditions. Each of the experiments was conducted in equipment and in a process substantially as shown in the figure. The results are shown in Table I.

Abbreviations used are: Bz=benzene, Et=ethylene, EB=ethylbenzene, Polys=polyalkyl benzenes.

TABLE I.—REACTOR PERFORMANCE

| Run number | Bz feed, lb./hr. | Polys feed, lb./hr. | Polys percent wt. of total feed | $C_2H_4$ feed, lb./hr. | Reactor temp., °C. | Residence time, minutes | $\epsilon$=Mole Et/ mole Bz [1] | Product analysis, wt. percent | | |
|---|---|---|---|---|---|---|---|---|---|---|
| | | | | | | | | Bz | EB | Polys |
| 1 | 4,000 | 1,200 | 21.5 | 380 | 198 | 5.4 | .57 | 44.2 | 41.3 | 14.5 |
| 2 | 4,000 | 1,200 | 21.6 | 360 | 199 | 5.4 | .55 | 46.4 | 39.6 | 14.0 |
| 3 | 4,000 | 2,000 | 31.1 | 435 | 198 | 4.7 | .69 | 36.1 | 43.8 | 20.1 |
| 4 | 5,000 | 600 | 10.0 | 410 | 199 | 5.04 | .43 | 54.6 | 35.8 | 9.6 |
| 5 | 2,400 | 900 | 24.9 | 312 | 199 | 8.3 | .61 | 44.7 | 34.7 | 20.6 |
| 6 | 7,000 | 1,960 | 22.0 | 640 | 199 | 3.2 | .50 | 50.1 | 37.4 | 12.5 |

[1] $\epsilon$—This ratio is actually the mole ratio of all ethyl groups to all benzene rings.

Runs 1 and 2 were made under substantially the same conditions to illustrate reproduceability of the data. The slightly lower yield to ethylbenzene in Run 2 reflects the slightly lower $\epsilon$ (ratio of ethyl groups to benzene rings) employed in Run 2.

Run 3 illustrates the ability of the process to simultaneously convert high levels of polyalkylbenzenes to ethylbenzene.

Run 4 is presented to show the use of lower proportions of polyethylbenzenes.

Runs 3 and 5 illustrate the effect of increasing the $\epsilon$ ratio on the yield to polyethylbenzenes.

Run 6 illustrates the effect of reduced residence time on the distribution of products in the reactor effluent.

While "light polys" are used in the feed of the above examples, similar results are achieved if the polyalkylbenzenes are recycled to the alkylator as produced. All of the above runs were conducted at a pressure of about 190 p.s.i.g.

EXAMPLE 2

Experiments were run under different conditions of temperature, time and epsilon values, using both high purity and low purity ethylene. Table II below is provided to show the specific reaction conditions and the results. Note that epsilon values of about 0.3 (Runs 3A and 3B) and 0.5 (Runs 1A and 1B) at identical times of approximately 5 minutes and at temperatures ranging from 130° to 148° C. provided good dealkylation or transalkylation of polyalkylbenzenes while maintaining good ethylbenzene production. Note also in Runs 5A and 5B that higher temperatures, shorter times, and an intermediate epsilon value (approximately 0.4) still provide good dealkylation of polyalkylbenzenes and production of ethylbenzene. However, shorter times and lower temperatures in Runs 6A and 6B give low ethylbenzene production and much less dealkylation of polyalkylbenzenes.

Table II also shows that, using the instant process of in situ catalyst preparation, the low purity ethylene gives substantially the same results as the high purity reactant. As mentioned previously, however, the amount of inerts in the ethylene has an effect on the sizing of equipment and the pressure required for the reaction.

The A runs employed 93.5% pure ethylene while B runs employed 99.9% pure ethylene.

TABLE III

| Feed conditions | Component | Weight percent composition | |
|---|---|---|---|
| | | Feed | Product |
| Run No. 1: | | | |
| Benzene, 4,000 lbs./hr | Bz | 81.6 | 57.7 |
| Ethylene, 310 lbs./hr | Et | 6.3 | -------- |
| Polys, 600 lbs./hr | EB | -------- | 30.8 |
| Temp., 197° C | DEB | 0.6 | 6.7 |
| Pressure, approx 200 p.s.i.g | TEB | 1.2 | 1.2 |
| $\epsilon$=0.37 | Res.[1] | 10.3 | 3.6 |
| Run No. 2: | | | |
| Benzene, 4,000 lbs./hr | Bz | 73.5 | 57.3 |
| Ethylene, 380 lbs./hr | Et | 5.8 | -------- |
| Polys, 1,200 lbs./hr | EB | -------- | 21.8 |
| Temp., 195° C | DEB | 2.6 | 7.8 |
| Pressure approx. 200 p.s.i.g | TEB | 1.9 | 3.1 |
| $\epsilon$=0.53 | Res.[1] | 16.2 | 10.0 |

[1] Res.=residue, largely higher polyalkylated benzenes

I claim:
1. An improved process for the production of alkylated aromatic hydrocarbons in the presence of an aluminum chloride complex catalyst which comprises
   (a) admixing, in a reaction vessel, aluminum, an olefin, aromatic hydrocarbons, polyalkylated aromatic hydrocarbons, and anhydrous HCl,
   (b) simultaneously alkylating the aromatic hydrocarbons and dealkylating the polyalkyl aromatic hydrocarbons in said reactor in the liquid phase at a temperature of between about 130° C. and about 250° C.,
   (c) separating the crude product from the catalyst complex,
   (d) separating the alkylated aromatic hydrocarbons from the unconverted aromatic hydrocarbon,
   (e) separating the monoalkylated aromatic hydrocarbon from the polyalkylated aromatic hydrocarbons,
   (f) recycling the aromatic hydrocarbon and polyal-

TABLE II

| Run number | Feed (mol. percent) | | | $\epsilon$ | Temp. (° C.) | Time (min.) | Product (mol. percent) | | | Total moles | Ethylene purity (percent) | Dealkylated polys (mol. percent)* |
|---|---|---|---|---|---|---|---|---|---|---|---|---|
| | Bz | Polys | Et | | | | Bz | Polys | EtBz | | | |
| 1A | 73.5 | 16.9 | 9.6 | 0.48 | 136 | 5.2 | 59.8 | 5.2 | 35.0 | 108.0 | 93.5 | 11.7 |
| 1B | 73.0 | 16.8 | 10.2 | 0.50 | 148 | 5.2 | 59.3 | 5.4 | 35.3 | 105.6 | 99.9 | 11.4 |
| 3A | 77.7 | 14.2 | 8.1 | 0.27 | 130 | 5.1 | 73.3 | 2.4 | 24.3 | 144.5 | 93.5 | 11.8 |
| 3B | 77.3 | 14.1 | 8.6 | 0.29 | 140 | 5.2 | 72.3 | 2.3 | 25.4 | 113.0 | 99.9 | 11.8 |
| 5A | 68.6 | 16.8 | 14.6 | 0.41 | 180 | 1.96 | 62.2 | 6.5 | 31.3 | 108.7 | 93.5 | 10.3 |
| 5B | 68.4 | 16.8 | 14.8 | 0.43 | 175 | 1.96 | 66.0 | 6.1 | 27.9 | 108.3 | 99.9 | 10.7 |
| 6A | 75.9 | 15.8 | 8.3 | 0.29 | 126 | 2.1 | 79.5 | 9.3 | 11.2 | 115.1 | 93.5 | 6.3 |
| 6B | 75.7 | 15.7 | 8.7 | 0.30 | 128 | 2.1 | 80.3 | 9.6 | 10.1 | 111.0 | 99.9 | 6.1 |

*This figure is the difference between the mole percent of polys in the feed and in the product, or the net amount of polys dealkylated.

EXAMPLE 3

In the preceding experiments, the polyalkylbenzenes fed to the reactor were primarily di- and triethylbenzenes with approximately 10% of them being heavier than triethylbenzene. The following two runs show feeding approximately 20–25% by weight polyalkylbenzenes, of which approximately 78% are those having molecular weights above triethylbenzene. This product which is largely higher polyalkylbenzenes, and ordinarily a waste product, is referred to as residue in Table III. The results indicate good dealkylation of these higher polyalkylbenzene waste products while maintaining good ethylbenzene production. Thus, the first run, which shows a somewhat lesser total amount of polys in the product than in the feed, indicates that the dealkylation results in the production of some ethylbenzene as well as large amounts of higher polys, i.e. di- and triethylbenzenes. The second run shows no decrease of total polys in the product, but nearly ⅓ less of higher polys in the product (30.4% less) than in the feed. The conditions of reaction and amounts of feed and products are shown in Table III. The ethylene used had a purity of 99.9%.

kylated aromatic hydrocarbons to the reaction vessel, and
   (g) recovering the monoalkylated aromatic hydrocarbon.

2. The process of claim 1 wherein the aromatic hydrocarbon is benzene and the polyalkylated aromatic hydrocarbons are polyalkylbenzenes and the olefin is ethylene.

3. The process of claim 2 wherein the polyalkylbenzenes are predominantly diethylbenzenes and triethylbenzenes.

4. The process of claim 2 wherein the polyalkylbenzenes are predominantly of higher molecular weight than triethylbenzene.

5. The process of claim 2 wherein the polyalkylbenzenes constitute up to about 30 percent by weight of the benzene fed.

6. The process of claim 2 wherein the aluminum is employed in an amount such that the weight ratio of total hydrocarbons admixed to aluminum metal is not less than 1000 to 1, nor more than 10,000 to 1.

7. The process of claim 2 wherein the aluminum is employed in an amount such that the weight ratio of total hydrocarbons admixed to aluminum is from about 2500 to 1 to about 5000 to 1.

References Cited

UNITED STATES PATENTS

| | | | |
|---|---|---|---|
| 3,277,195 | 10/1966 | Bodre | 260—672 T |
| 3,303,230 | 2/1967 | McMinn | 260—672 T |
| 2,057,306 | 10/1936 | Martin et al. | 252—442 |
| 3,205,276 | 9/1965 | Toland | 260—671 P |
| 2,864,874 | 12/1958 | Enos | 260—671 P |
| 3,306,943 | 2/1967 | Sulo et al. | 260—671 P |
| 3,488,741 | 1/1970 | Muller | 260—671 P |
| 3,536,772 | 10/1970 | Csomontanyi et al. | 260—672 T |

CURTIS R. DAVIS, Primary Examiner

U.S. Cl. X.R.

260—671 C, 671 P

PO-1050
(5/69)

UNITED STATES PATENT OFFICE
CERTIFICATE OF CORRECTION

Patent No. 3,766,290    Dated October 16, 1973

Inventor(s) Cleo Dale Carlson

It is certified that error appears in the above-identified patent and that said Letters Patent are hereby corrected as shown below:

Col. 3, line 5, "particulates" should be changed to --particulate--.

Col. 3, line 13, "temperatuers" should be changed to --temperatures--.

Col. 3, line 44, change "in" to --is--.

Col. 3, line 73, change "products" to --product--.

Col. 4, line 24, change "B.t.u." to --B.T.U.--.

Col. 6, Table II change "144.5" to --114.5--.

Col. 5, line 70, change "higher" to -lighter--.

Signed and sealed this 5th day of November 1974.

(SEAL)
Attest:

McCOY M. GIBSON JR.
Attesting Officer

C. MARSHALL DANN
Commissioner of Patents